(12) United States Patent
Yogerst et al.

(10) Patent No.: US 12,056,548 B2
(45) Date of Patent: Aug. 6, 2024

(54) TRANSACTION CARD WITH STORAGE FOR A PHYSICAL KEY

(71) Applicant: Capital One Services, LLC, McLean, VA (US)

(72) Inventors: Shannon Yogerst, New York, NY (US); Tyler Maiman, Melville, NY (US); Bryant Yee, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/049,417

(22) Filed: Oct. 25, 2022

(65) Prior Publication Data
US 2024/0135128 A1    Apr. 25, 2024

(51) Int. Cl.
*G06K 19/04*    (2006.01)

(52) U.S. Cl.
CPC .................. *G06K 19/041* (2013.01)

(58) Field of Classification Search
CPC .................................................... G06K 19/041
See application file for complete search history.

(56) References Cited

U.S. PATENT DOCUMENTS

| | | | | |
|---|---|---|---|---|
| 4,739,877 A | * | 4/1988 | Olson .................. | A44B 15/005 206/38.1 |
| 4,941,335 A | * | 7/1990 | Allen ...................... | E05B 19/26 70/459 |
| 4,946,030 A | * | 8/1990 | Guridi .................. | A45C 11/326 206/38.1 |
| 6,257,469 B1 | * | 7/2001 | Cohn ...................... | A45F 5/004 206/86 |
| 7,083,083 B2 | * | 8/2006 | Droz ................ | G06K 19/07749 343/702 |
| 2004/0126284 A1 | * | 7/2004 | Lilly .................... | G01N 1/2202 422/119 |
| 2008/0116283 A1 | * | 5/2008 | Newbrough .............. | B67B 7/16 235/487 |

OTHER PUBLICATIONS

CBC Archives. "Why the Credit Card Key could be a lifesaver . . . if you had your wallet". Aug. 15, 2019.*

* cited by examiner

*Primary Examiner* — Thien M Le
*Assistant Examiner* — Asifa Habib
(74) *Attorney, Agent, or Firm* — Harrity & Harrity, LLP (57) ABSTRACT

In some implementations, a transaction card includes a card body having a first surface and a second surface opposite the first surface, and the card body may be in a configuration that defines a storage area for a physical key. The transaction card may include at least one of an integrated circuit chip or a magnetic stripe accessible from at least one of the first surface or the second surface of the card body. The transaction card may include a connecting element to connect the physical key to the card body. The connecting element may be configured to enable movement of the physical key between a storage position, in which at least a portion of the physical key occupies the storage area, and a use position, in which at least a portion of the physical key is outside of the storage area.

20 Claims, 5 Drawing Sheets

TRANSACTION CARD WITH STORAGE FOR A PHYSICAL KEY

BACKGROUND

Transactions often involve use of a transaction card (e.g., a credit card, a debit card, a gift card, an automated teller machine (ATM) card, a rewards card, an access card, or client loyalty card, among other examples) to pay for products or services at a transaction terminal (e.g., point of sale (PoS) terminal) of an individual or business engaged in the sale of goods or services (e.g., via a swiping of the transaction card at a card reader, insertion of the transaction card into a chip reader, or wireless transmission of transaction card data to a wireless receiver). In some instances, a magnetic stripe, integrated circuit chip, radio frequency (RF) antenna, and/or radio frequency identification (RFID) tag may be included in a transaction card to provide information associated with the transaction card (e.g., an account identifier, account information, a payment token, or the like).

SUMMARY

In some implementations, a transaction card includes a card body having a first surface and a second surface opposite the first surface, and the card body may be in a configuration that defines a storage area for a physical key. The transaction card may include at least one of an integrated circuit (IC) chip or a magnetic stripe accessible from at least one of the first surface or the second surface of the card body. The transaction card may include a connecting element to connect the physical key to the card body. The connecting element may be configured to enable movement of the physical key between a storage position, in which at least a portion of the physical key occupies the storage area, and a use position, in which at least a portion of the physical key is outside of the storage area.

In some implementations, a transaction card includes a card body having a first surface and a second surface opposite the first surface, and the card body may be in a configuration that defines a storage area for a physical key. The transaction card may include a connecting element to connect the physical key to the card body. The connecting element may be configured to enable movement of the physical key between a storage position, in which at least a portion of the physical key occupies the storage area, and a use position, in which at least a portion of the physical key is outside of the storage area.

In some implementations, a transaction card includes a card body having a first surface and a second surface opposite the first surface. The transaction card may include at least one of an IC chip or a magnetic stripe accessible from at least one of the first surface or the second surface of the card body. The transaction card may include a connecting element to connect a physical key to the card body. The connecting element may be configured to enable movement of the physical key between a storage position and a use position.

DETAILED DESCRIPTION

The following detailed description of example implementations refers to the accompanying drawings. The same reference numbers in different drawings may identify the same or similar elements.

An individual may carry numerous items when traveling away from home. For example, the individual may carry one or more transaction cards (e.g., credit cards) and one or more keys (e.g., a house key, a car key, or the like) in a storage article (e.g., a pocket, a wallet, a purse, or the like). Sometimes, these items may occupy a significant amount of space in the storage article and/or may result in excessive bulkiness of the storage article. Moreover, a key can be easily lost due to its small size.

Some implementations described herein provide a transaction card with storage for a physical key. In some implementations, a card body of the transaction card may be in a configuration that defines a storage area for the key. For example, the storage area may be a cut-out area of the card body or a cavity in the card body. The transaction card may include a connecting element, such as a hinge element, a tab, or the like, configured to connect the key to the card body. The connecting element may be configured to enable movement of the key between a storage position, in which at least a portion of the key occupies the storage area, and a use position, in which at least a portion of the key is outside of the storage area. For example, the connecting element may enable the key to move between the storage position and the use position in a swinging motion, in a sliding motion, or the like. In the use position, the card body may be grasped by an individual to facilitate turning of the key in a lock. In this way, the transaction card reduces the combined footprint of the transaction card and the key, thereby conserving space. Moreover, connection of the key to the transaction card reduces a likelihood that the key will be lost.

Figure 1A:
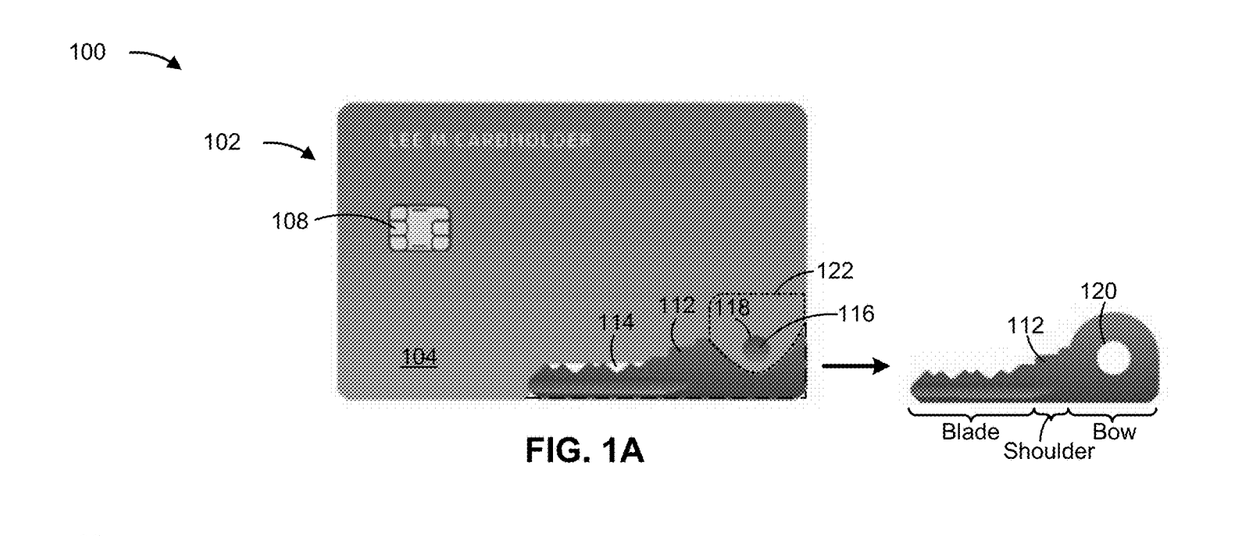
FIG. 1A is a front view of an example transaction card, in accordance with some embodiments of the present disclosure.
Figure 1B:
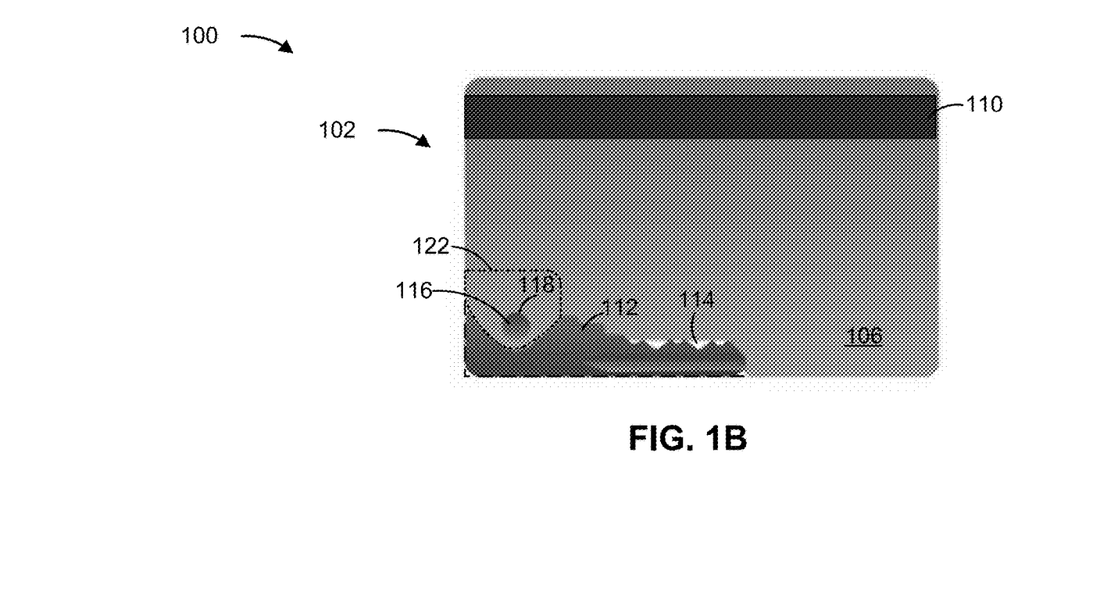
FIG. 1B is a back view of the example transaction card of FIG. 1A, in accordance with some embodiments of the present disclosure.
Figure 1C:
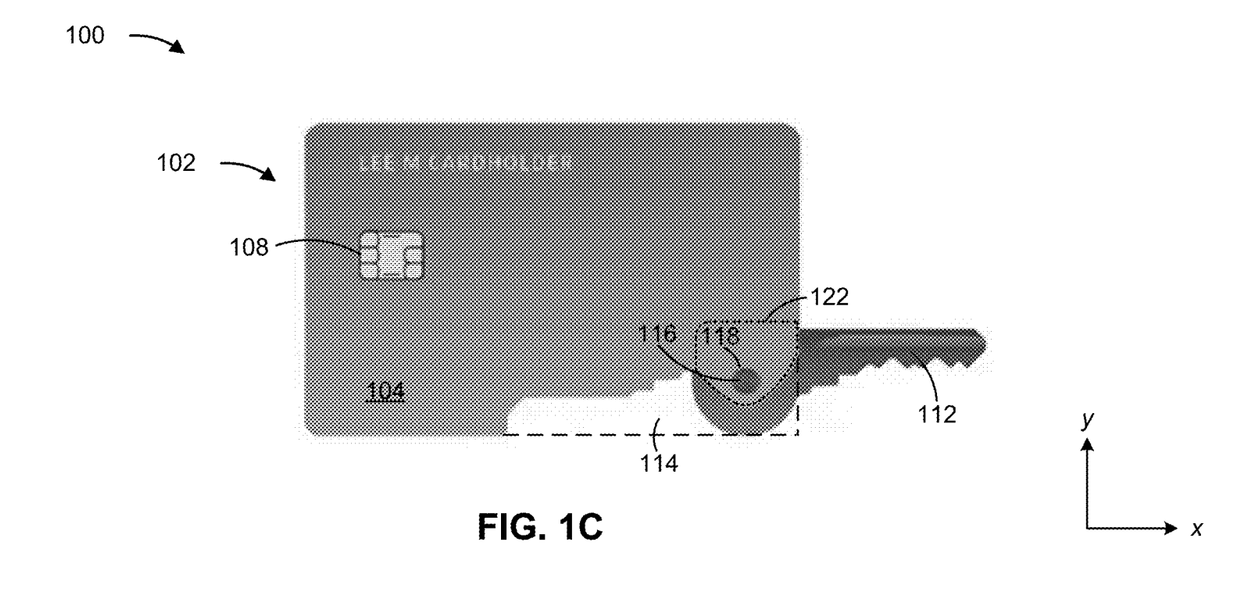
FIG. 1C is a front view of the example transaction card of FIG. 1A, in accordance with some embodiments of the present disclosure.

FIG. 1A is a front view of an example transaction card 100, FIG. 1B is a back view of the transaction card 100, and FIG. 1C is a front view of the transaction card 100. The transaction card 100 may include a credit card, a debit card, a gift card, an ATM card, a rewards card, an access card, or a client loyalty card, among other examples.

The transaction card 100 may include a card body 102. The card body 102 may have a length (e.g., along the x-axis shown) and a height (e.g., along the y-axis shown). In some implementations, the length of the card body 102 may be greater than the height (e.g., a maximum height) of the card body 102. For example, the length of the card body 102 may be about (e.g., ±5%) 85 millimeters (mm) (e.g., 85.6 mm) and the height of the card body 102 (e.g., the maximum height) may be about 54 mm (e.g., 53.98 mm).

The card body 102 may include (e.g., may be composed of) a resilient material (e.g., a material that returns to an equilibrium position following deformation). For example, the card body 102 may include a plastic (e.g., polyvinyl chloride (PVC)) and/or a metal (e.g., steel). The card body 102 may include a thin substrate upon which information or visual indicia are printed. The card body 102 may have a first surface 104 (e.g., a front surface, as shown in FIGS. 1A and 1C) and a second surface 106 (e.g., a back surface, as shown in FIG. 1B) opposite the first surface 104.

The transaction card 100 may include an IC chip 108 (e.g., a EUROPAY®, MASTERCARD®, VISA® (EMV) chip). Additionally, or alternatively, the transaction card 100 may include a magnetic stripe 110. The IC chip 108 may be embedded in the transaction card 100 and accessible from a surface of the card body 102 (e.g., the first surface 104, as shown). For example, electrical contacts of the IC chip 108 may be electrically accessible (e.g., by a chip reader) from the surface of the card body 102. The magnetic stripe 110 (also referred to as a "magnetic strip") may be disposed on the transaction card 100 and accessible from a surface of the card body 102 (e.g., the second surface 106, as shown). For example, the magnetic stripe 110 may be readable (e.g., by a magnetic stripe reader) from the surface of the card body 102. The IC chip 108 and the magnetic stripe 110 may store and/or encode information associated with the transaction card 100. For example, the information may identify an account associated with the transaction card 100.

The card body 102 may be in a configuration that defines a storage area for a physical key 112 (e.g., a key that opens a physical lock), such as a house key, a car key, a safe key, a lock box key, a luggage key, or the like. As shown in FIGS. 1A-1C, the card body 102 may be a rectangular shape with a cut-out area 114 (e.g., a key-shaped cut-out area) at one or more edges of the rectangular shape, and the cut-out area 114 may be the storage area for the key 112. Thus, the card body 102 (e.g., when viewed two-dimensionally as shown) may have no line of symmetry. For example, a section of a perimeter of the card body 102 may be recessed relative to an outermost edge of the perimeter, and the cut-out/storage area 114 may be along that section of the perimeter. In some implementations, the card body 102 may include a first corner (e.g., a rounded corner) of a rectangle, a second corner of the rectangle, a third corner of the rectangle, and the cut-out area 114 may be at a location of a fourth corner of the rectangle. For example, a first half of the card body 102 (e.g., a top half) may be a rectangle, and a second half of the card body 102 (e.g., a bottom half) may be non-rectangular (e.g., an irregular shape).

An area of the cut-out area 114 may be greater than an area of the key 112. In some implementations, a shape of the cut-out area 114 may correspond to a shape of the key 112. That is, a section of a perimeter of the card body 102 along the cut-out area 114 may follow the contours of a portion of the key 112 (e.g., in an un-cut state of the key 112).

The transaction card 100 may include a connecting element to connect the key 112 to the card body 102. The connecting element may be configured to enable movement of the key 112 between a storage position in which at least a portion of the key 112 (e.g., the blade of the key 112) occupies the storage area (as shown in FIGS. 1A-1B) and a use position in which at least a portion of the key 112 (e.g., the blade of the key 112) is outside of the storage area (as shown in FIG. 1C). For example, the key 112 may pivot or swing about the connecting element between the storage position and the use position. As shown in FIGS. 1A-1C, the card body 102 may include an aperture 118, and the connecting element may be a hinge element 116 (e.g., a grommet, a pin, a peg, or the like) disposed in the aperture 118. As shown in FIG. 1C, in the storage position of the key 112, a first section of a perimeter of the transaction card 100 may be defined by an edge of the card body 102, and a second section of the perimeter of the transaction card 100 may be defined by an edge of the key 112. Thus, the transaction card 100 may have an overall rectangular shape when the key 112 is in the storage position.

In some implementations, the transaction card 100 may omit the key 112. That is, the key 112 may be attached to (and detached from) the transaction card 100 by a user of the transaction card 100. In some implementations, the transaction card 100 may include the key 112. That is, the key 112 may be connected to the transaction card 100 in a manner that does not permit a user to remove the key 112 from the transaction card 100 (e.g., under normal use conditions). Here, the key 112 may be a blank key, and the user may have the key 112 cut for a particular lock. In some implementations, a shape of the key 112 may include a corner (e.g., with straight edges of the key 112 extending perpendicularly from the corner) that corresponds in shape and size to a corner of the card body 102, such that the second section of the perimeter of the transaction card 100 may be defined by the edge of the key 112. For example, the key 112 may have a straight edge extending along the blade of the key 112, the shoulder of the key 112, and the bow of the key 112 that defines an edge of the transaction card 100 when the key 112 is in the storage position.

The key 112 may include an aperture 120 in the bow of the key 112. The aperture 120 in the key 112 may be aligned with the aperture 118 in the card body 102, and the connecting element (e.g., the hinge element 116) may extend through the aperture 118 and the aperture 120 to connect the key 112 to the card body 102. In some implementations, the card body 102 may include a cavity 122 (e.g., a void space) between the first surface 104 and the second surface 106. The cavity 122 may be configured to receive a portion (e.g., a portion of the bow) of the key 112 and to allow movement of the key 112 from the storage position to the use position. Walls of the cavity 122 may also prevent over-rotation of the key 112 during movement of the key 112 from the storage position to the use position. A thickness of the card body 102 about the cavity 122 may be greater than a thickness of a remaining portion of the card body 102 (e.g., to enable insertion of the transaction card 100 into a chip reader or swiping of the transaction card 100 at a magnetic stripe reader).

In some implementations, the cut-out area 114 may be configured such that, in the storage position, the blade of the key 112 extends (e.g., away from the bow of the key 112) in a direction of the length of the card body 102, as shown. Here, the magnetic stripe 110 may also extend along the length of the card body 102. Alternatively, the cut-out area 114 may be configured such that, in the storage position, the blade of the key 112 extends (e.g., away from the bow of the key 112) in a direction of the height of the card body 102. Here, the magnetic stripe 110 may also extend along the height of the card body 102.

As indicated above, FIGS. 1A-1C are provided as examples. Other examples may differ from what is described with regard to FIGS. 1A-1C.

Figure 2A:
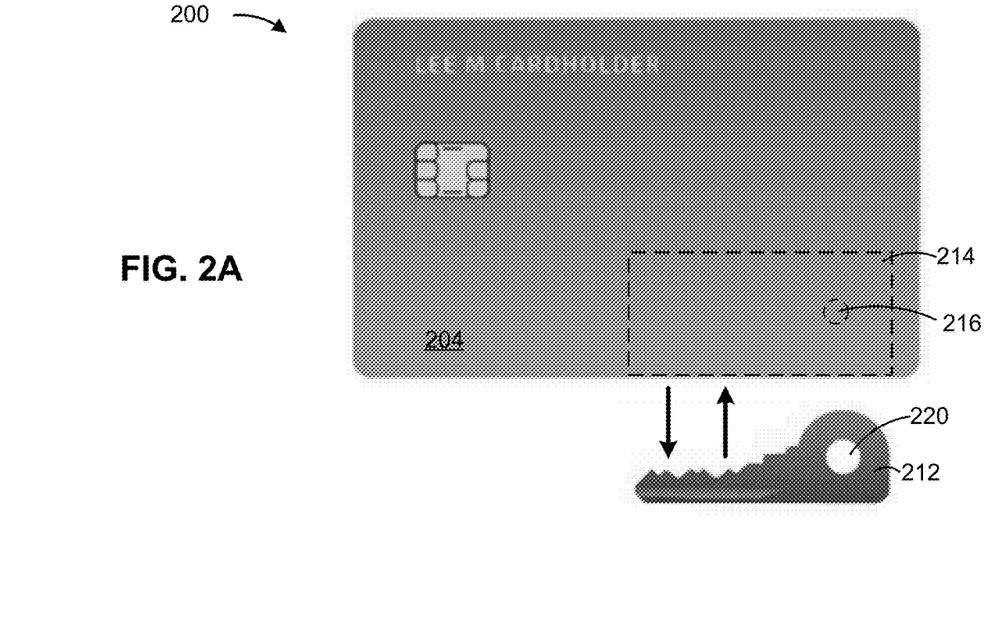
FIG. 2A is a front view of an example transaction card, in accordance with some embodiments of the present disclosure.
Figure 2B:
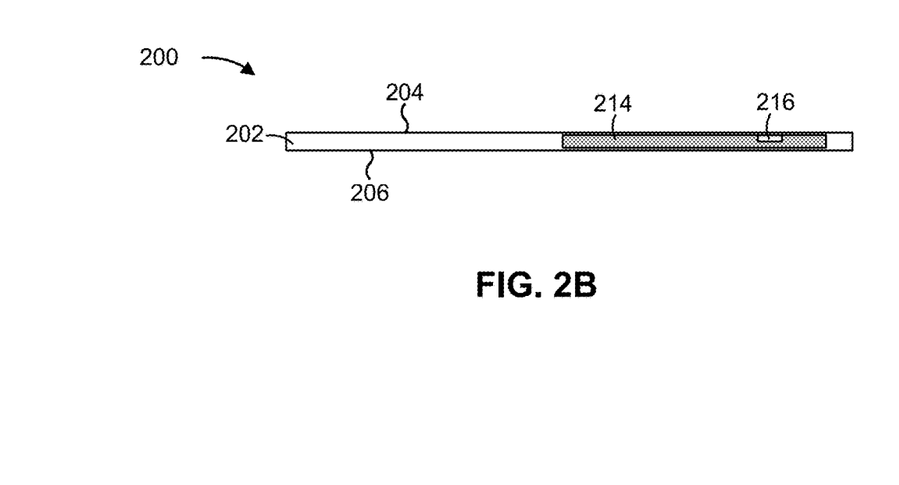
FIG. 2B is a bottom view of the example transaction card of FIG. 2A, in accordance with some embodiments of the present disclosure.

FIG. 2A is a front view of an example transaction card 200, and FIG. 2B is a bottom view of the transaction card 200. The transaction card 200 may be any of the types of transaction cards described in connection with FIGS. 1A-1C. The transaction card 200 may include a card body 202 having a first surface 204 and a second surface 206 opposite the first surface 204, in a similar manner as described in connection with FIGS. 1A-1C. The transaction card 200 may include an IC chip and/or a magnetic stripe, in a similar manner as described in connection with FIGS. 1A-1C. In some implementations, the transaction card 200 may have a generally rectangular shape; however, other shapes are possible.

The card body 202 may be in a configuration that defines a storage area for a physical key 212. As shown in FIGS. 2A-2B, the card body 202 may include a cavity 214 (e.g., a void space) between the first surface 204 and the second surface 206, and the cavity 214 may be the storage area for the key 212. A volume of the cavity 214 may be greater than a volume of the key 212. In some implementations, the cavity 214 may have a rectangular shape, as shown. In some implementations, a shape of the cavity 214 may correspond to a shape of the key 212. That is, a section of a wall of the cavity 214 may follow the contours of a portion of the key 212 (e.g., in an un-cut state of the key 212). A thickness of the card body 202 about the cavity 214 may be greater than a thickness of a remaining portion of the card body 202 (e.g., to enable insertion of the transaction card 200 into a chip reader or swiping of the transaction card 200 at a magnetic stripe reader).

The transaction card 200 may include a connecting element to connect the key 212 to the card body 202. As described above, the connecting element may be configured to enable movement of the key 212 between a storage position in which at least a portion of the key 212 (e.g., the entirety of the key 212) occupies the storage area and a use position in which at least a portion of the key 212 (e.g., the entirety of the key 212) is outside of the storage area. For example, the key 212 may be engaged with the connecting element in the storage position and the key 212 may be disengaged from the connecting element in the use position. As shown in FIGS. 2A-2B, the connecting element may include at least one tab 216 that projects from the card body 102 into the cavity 214. For example, the tab 216 may project from a back of the first surface 204 into the cavity 214 toward a back of the second surface 206 (e.g., leaving a gap between the tab 216 and the back of the second surface that is narrower than a thickness of the key 212). In some implementations, a first tab 216 may project from a back of the first surface 204 into the cavity 214, and a second tab 216 (not shown) may project from a back of the second surface 206 into the cavity 214 and toward the first tab 216 (e.g., leaving a gap between the first tab 216 and the second tab 216 that is narrower than a thickness of the key 212).

In some implementations, the transaction card 200 may omit the key 212. That is, the key 212 may be attached to (and detached from) the transaction card 200 by a user of the transaction card 100. For example, the key 212 may include an aperture 220 in the bow of the key 212, in a similar manner as described in connection with FIG. 1, and the connecting element (e.g., the tab(s) 216) may extend into or through the aperture 220 to connect the key 212 to the card body 202.

In some implementations, an opening to the cavity 214 may be along the length of the card body 102, as shown, along the height of the card body 102, or along both the length and the height of the card body 102.

As indicated above, FIGS. 2A-2B are provided as examples. Other examples may differ from what is described with regard to FIGS. 2A-2B.

Figure 3A:
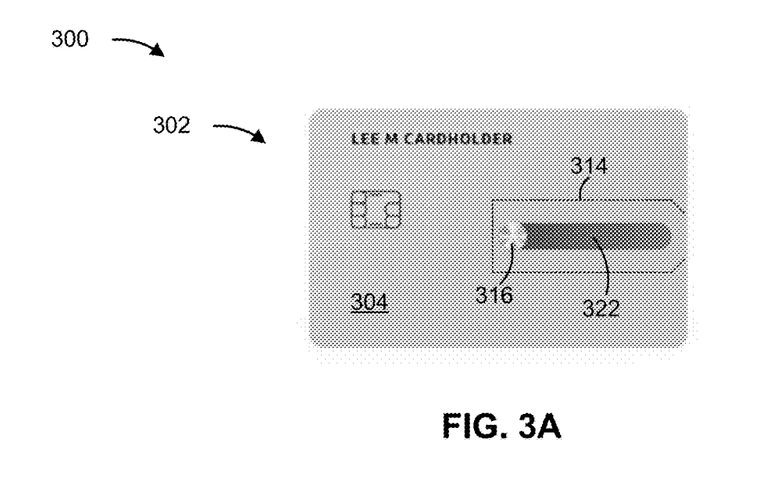
FIG. 3A is a front view of an example transaction card, in accordance with some embodiments of the present disclosure.
Figure 3B:
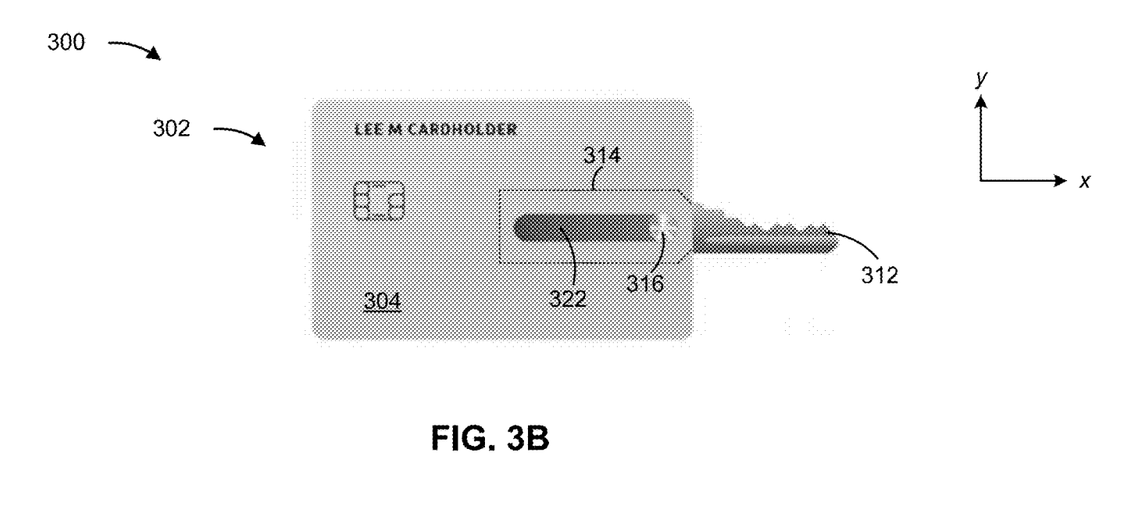
FIG. 3B is a front view of the example transaction card of FIG. 3A, in accordance with some embodiments of the present disclosure.
Figures 3C, 3D:
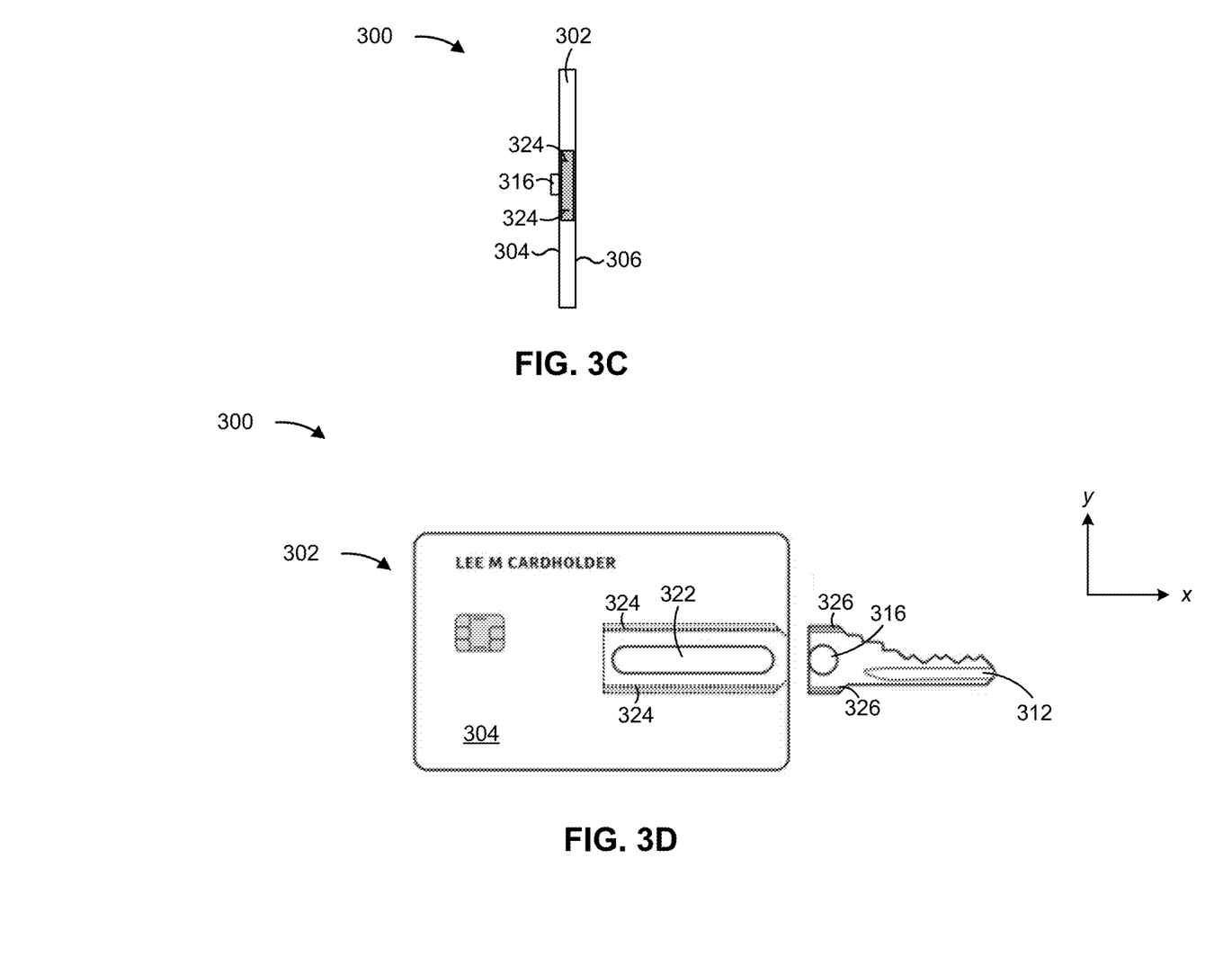
FIG. 3C is a side view of the example transaction card of FIG. 3A, in accordance with some embodiments of the present disclosure.
FIG. 3D is an exploded view of the example transaction card of FIG. 3A, in accordance with some embodiments of the present disclosure.

FIG. 3A is a front view of an example transaction card 300, FIG. 3B is a front view of the transaction card 300, FIG. 3C is a side view of the transaction card 300, and FIG. 3D is an exploded view of the transaction card 300. The transaction card 300 may be any of the types of transaction cards described in connection with FIGS. 1A-1C. The transaction card 300 may include a card body 302 having a first surface 304 and a second surface 306 opposite the first surface 304, in a similar manner as described in connection with FIGS. 1A-1C. The transaction card 300 may include an IC chip and/or a magnetic stripe, in a similar manner as described in connection with FIGS. 1A-1C. In some implementations, the transaction card 300 may have a generally rectangular shape; however, other shapes are possible.

The card body 302 may be in a configuration that defines a storage area for a physical key 312. As shown in FIGS. 3A-3D, the card body 302 may include a cavity 314 (e.g., a void space) between the first surface 304 and the second surface 306, and the cavity 314 may be the storage area for the key 312. A volume of the cavity 314 may be greater than a volume of the key 312. In some implementations, the cavity 214 may have an overall rectangular shape that tapers toward an edge of the card body 302, as shown. That is, the shape of the cavity may be a combination of a rectangle and a trapezoid. This shape may enable the key 312 to slide within the cavity 314 while preventing removal of the key 312 from the cavity 314. A thickness of the card body 302 about the cavity 314 may be greater than a thickness of a remaining portion of the card body 302 (e.g., to enable insertion of the transaction card 300 into a chip reader or swiping of the transaction card 300 at a magnetic stripe reader).

The transaction card 300 may include a connecting element to connect the key 312 to the card body 302. As described above, the connecting element may be configured to enable movement of the key 312 between a storage position in which at least a portion of the key 312 (e.g., the entirety of the key 312) occupies the storage area, and a use position in which at least a portion of the key 312 (e.g., at least the blade of the key 312) is outside of the storage area. The card body 302 may include, in the first surface 304 and/or in the second surface 306, an elongate opening 322 to the cavity 314. The opening 322 may be rectangular, pill-shaped, or another elongated shape. As shown in FIGS. 3A-3D, the connecting element may include a tab 316 that is connected to the key 312. The tab 316 may be slidably engaged with the opening 322. The tab 316 may be configured for grasping or other manipulation by a user of the transaction card 300. Sliding of the tab 316 distally may move the key 312 toward the use position, and sliding of the tab proximally may move the key 312 toward the storage position.

As shown in FIGS. 3C-3D, the card body 302 may include a first element 324 (e.g., one of a track or a channel) of a track-and-channel coupling facing the cavity 314 (shown in FIGS. 3C-3D as a track). For example, the first element 324 of the track-and-channel coupling may be on a back of the first surface 304 and/or a back of the second surface 306 of the transaction card 300. The first element 324 of the track-and-channel coupling may be configured to slidably engage with a second element 326 (e.g., the other of the track or the channel) of the track-and-channel coupling on the key 312. For example, the second element 326 of the track-and-channel coupling may be on the bow of the key 312. The track-and-channel coupling may force linear movement of the key 312 during movement of the key 312 between the storage position and the use position.

In some implementations, the transaction card 300 may omit the key 312. That is, the key 312 may be attached to (and detached from) the transaction card 300 by a user of the transaction card 300. In some implementations, the transaction card 300 may include the key 312. That is, the key 312 may be connected to the transaction card 300 in a manner that does not permit a user to remove the key 312 from the transaction card 300 (e.g., under normal use conditions). Here, the key 312 may be a blank key, and the user may have the key 312 cut for a particular lock.

In some implementations, an elongated dimension of the opening 322 may extend in a direction of the length of the card body 102, such that the key 312 moves (e.g., slides) from the storage position to the use position along the length of the card body 102, as shown. Alternatively, the elongated dimension of the opening 322 may extend in a direction of the height of the card body 102, such that the key 312 moves (e.g., slides) from the storage position to the use position along the height of the card body 102.

As indicated above, FIGS. 3A-3D are provided as examples. Other examples may differ from what is described with regard to FIGS. 3A-3D.

In some implementations, a transaction card may include multiple storage areas and connecting elements for multiple keys. For example, the transaction card 100 may include multiple cut-out areas 114 (e.g., on opposite sides of the card body 102 from each other). As another example, the transaction card 200 may include multiple cavities 214. As a further example, the transaction card 300 may include multiple cavities 314 and openings 322 (e.g., where the cavities 314 and openings 322 are parallel to each other). In some implementations, a transaction card may include a combination of two or more of the storage areas/connecting elements described in connection with FIGS. 1A-1C, 2A-2B, and 3A-3C. In some implementations, a magnetic stripe of a transaction card may extend along the height of the transaction card when multiple storage areas are employed.

The foregoing disclosure provides illustration and description, but is not intended to be exhaustive or to limit the implementations to the precise forms disclosed. Modifications may be made in light of the above disclosure or may be acquired from practice of the implementations.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transaction card, comprising:
    a card body having a first surface and a second surface opposite the first surface,
        wherein the card body is in a configuration that defines a storage area for a physical key, and
        wherein the card body comprises a track-and-channel coupling configured to provide a particular type of movement of the physical key between a storage position and a use position;
    at least one of an integrated circuit (IC) chip or a magnetic stripe accessible from at least one of the first surface or the second surface of the card body; and
    a connecting element to connect the physical key to the card body,
        wherein the connecting element is configured to enable the particular type of movement of the physical key.

2. The transaction card of claim 1, further comprising:
    the physical key connected to the connecting element.

3. The transaction card of claim 2, wherein a first section of a perimeter of the transaction card is defined by an edge of the card body, and a second section of the perimeter of the transaction card is defined by an edge of the physical key in the storage position.

4. The transaction card of claim 1, wherein the connecting element comprises a grommet disposed in an aperture in the card body.

5. The transaction card of claim 1, wherein the card body includes a cut-out area, and
    wherein an edge of the card body along the cut-out area corresponds to an edge of the physical key.

6. The transaction card of claim 1, wherein the card body includes a cavity between the first surface and the second surface, and
    wherein the storage area is the cavity.

7. The transaction card of claim 6, wherein the connecting element comprises at least one tab projecting from the card body into the cavity.

8. The transaction card of claim 6, wherein the card body includes an elongate opening, to the cavity, in at least one of the first surface or the second surface, and
    wherein the connecting element comprises a tab that is slidably engaged with the elongate opening.

9. The transaction card of claim 6, wherein the card body includes one of a track or a channel, of the track-and-channel coupling, facing the cavity,
   wherein the one of the track or the channel is configured to slidably engage with the other of the track or the channel, of the track-and-channel coupling, on the physical key to provide a linear movement, as the particular type of movement, of the physical key when slid between the storage position, in which at least a portion of the physical key occupies the storage area, and the use position, in which at least a portion of the physical key is outside of the storage area.

10. A transaction card, comprising:
   a card body having a first surface and a second surface opposite the first surface,
      wherein the card body is in a configuration that defines a storage area for a physical key, and
      wherein the card body comprises a track-and-channel coupling configured to provide a particular type of movement of the physical key between a first position, in which at least a portion of the physical key occupies the storage area, and a second position, in which at least a portion of the physical key is outside of the storage area; and
   a connecting element to connect the physical key to the card body,
      wherein the connecting element is configured to enable movement of the physical key between the first position and the second position.

11. The transaction card of claim 10, further comprising: the physical key connected to the connecting element.

12. The transaction card of claim 10, wherein a section of a perimeter of the card body is recessed relative to an outermost edge of the perimeter, and
   wherein the storage area is along the section.

13. The transaction card of claim 10, wherein the card body includes a first corner of a rectangle, a second corner of the rectangle, a third corner of the rectangle, and a cut-out area at a location of a fourth corner of the rectangle, and
   wherein the storage area is the cut-out area.

14. The transaction card of claim 10, wherein the card body includes a cavity between the first surface and the second surface, and
   wherein the storage area is the cavity.

15. A transaction card, comprising:
   a card body having a first surface and a second surface opposite the first surface,
      wherein the card body comprises a track-and-channel coupling configured to provide linear movement of a physical key between a storage position and a use position;
   at least one of an integrated circuit (IC) chip or a magnetic stripe accessible from at least one of the first surface or the second surface of the card body; and
   a connecting element to connect the physical key to the card body,
      wherein the connecting element is configured to enable movement of the physical key between the storage position and the use position.

16. The transaction card of claim 15, further comprising: the physical key connected to the connecting element.

17. The transaction card of claim 15, wherein the card body includes a cavity between the first surface and the second surface.

18. The transaction card of claim 17, wherein the card body includes an elongate opening, to the cavity, in at least one of the first surface or the second surface, and
   wherein the connecting element comprises a tab that is slidably engaged with the elongate opening.

19. The transaction card of claim 18, wherein the card body includes one of a track or a channel, of the track-and-channel coupling, facing the cavity,
   wherein the one of the track or the channel is configured to slidably engage with the other of the track or the channel, of the track-and-channel coupling, on the physical key.

20. The transaction card of claim 15, wherein the connecting element is a hinge element.

* * * * *